(12) United States Patent
Musson

(10) Patent No.: US 7,404,905 B2
(45) Date of Patent: *Jul. 29, 2008

(54) WATER TREATMENT SYSTEM, APPARATUS AND METHOD

(75) Inventor: Andrew Peter Musson, Waipawa (NZ)

(73) Assignee: Water Rite Limited, Hastings (NZ)

( * ) Notice: Subject to any disclaimer, the term of this patent is extended or adjusted under 35 U.S.C. 154(b) by 271 days.

This patent is subject to a terminal disclaimer.

(21) Appl. No.: 11/142,239

(22) Filed: Jun. 2, 2005

(65) Prior Publication Data

US 2006/0027506 A1 Feb. 9, 2006

(30) Foreign Application Priority Data

Aug. 6, 2004 (NZ) .................................... 534551

(51) Int. Cl.
*C02F 1/46* (2006.01)

(52) U.S. Cl. ................ 210/748; 210/170.09; 210/167.2; 210/243; 210/743

(58) Field of Classification Search .................. 210/748, 210/150, 743, 243, 167.2, 170.9
See application file for complete search history.

(56) References Cited

U.S. PATENT DOCUMENTS

| 4,208,258 A | * | 6/1980 | Balko et al. .................. 205/771 |
| 4,382,866 A | * | 5/1983 | Johnson ....................... 210/748 |
| 5,728,303 A | | 3/1998 | Johnson |

FOREIGN PATENT DOCUMENTS

| CN | 1381404 | 11/2002 |
| DE | 4102156 | 7/1992 |
| FR | 2849846 | 7/2004 |
| JP | 55013176 | 1/1980 |
| JP | 7163814 | 6/1995 |
| JP | 2004049967 | 2/2004 |
| JP | 2004321962 | 11/2004 |
| RU | 2134659 | 8/1999 |
| TW | 416863 | 1/2001 |
| WO | WO9622945 | 8/1996 |

\* cited by examiner

*Primary Examiner*—Walter D. Griffin
*Assistant Examiner*—Cameron J Allen
(74) *Attorney, Agent, or Firm*—O. M. (Sam) Zaghmout; Bio Intellectual Property Services

(57) ABSTRACT

The invention relates to a water treatment apparatus, method and system for use in the treatment of wastewater or contaminated water, the apparatus including an energisable material or base platform configured and arranged for placement in the flow of wastewater, the platform having a substantial surface area with a media layer suitable for use in hosting bacterial cultures, and further including an energisable layer attachable to the media layer which, when energized with an electrostatic negative voltage charge from a direct current power source, can attract suspended solids in the wastewater and bond aerobic bacterial cultures to the media layer, and whereby additional media can be introduced into the area about the energisable material or layer that can also attract suspended solids thereto.

8 Claims, 4 Drawing Sheets

WATER TREATMENT SYSTEM, APPARATUS AND METHOD

CROSS-REFERENCE TO RELATED APPLICATIONS

This application claims the benefit of New Zealand Patent Application No. 534551, filed Aug. 6, 2004. The entire disclosure of this prior application is hereby incorporated by reference.

FEDERALLY SPONSORED RESEARCH

Not Applicable

SEQUENCE LISTING OR PROGRAM

Not Applicable

TECHNICAL FIELD

This invention relates to water treatment systems, methods and apparatus. More particularly, but not exclusively, this invention relates to a wastewater treatment system, apparatus and methods utilizing electrostatic fields for the treatment of suspended solids and the like in a wastewater treatment system.

BACKGROUND ART

The treatment of water, and recycling water for reuse, commonly involves a variety of stages and various systems for effective treatment to increase the quality of the water. With water treatment, the removal of impurities, suspended solids and the like is desirable, but often involves a number of stages. Wastewater systems generally comprise a number of chambers such as a primary chamber(s) used for anaerobic breakdown and a secondary chamber(s) for aerobic breakdown of waste products, with wastewater being swiftly moved from one chamber to another, and then from the final chamber(s) into say a subterranean dispersal field.

Such a system may not be as thorough as desired, particularly in respect of the treatment of suspended solids before being discharged into a dispersal field.

It is a non-limiting object of the present invention to provide an apparatus for the treatment of wastewater that overcomes at least some of the above mentioned problems, or which provides the public with a useful choice.

It is a further non-limiting object of the present invention to provide a method of treatment of wastewater that overcomes at least some of the above mentioned problems, or which provides the public with a useful choice.

It is a further non-limiting object of the present invention to provide a system for the treatment of wastewater that overcomes at least some of the above mentioned problems, or which provides the public with a useful choice.

SUMMARY OF THE INVENTION

According to a broad aspect of the invention there is provided a water treatment apparatus for use in the treatment of wastewater or contaminated water, the apparatus including a base platform configured and arranged for placement in the flow of wastewater, the platform having a substantial surface area and a plurality of apertures therein, in use, for allowing water to flow therethrough, and wherein the other side of the platform from the flow of water is covered substantially with a media layer suitable for use in hosting bacterial cultures, and further including an electrified mesh layer attached to the media layer on the other side from the base platform, the mesh layer, in use, being supplied with an electrostatic negative voltage charge from a direct current power source to attract suspended solids in the wastewater and bond aerobic bacterial cultures to the media layer.

Desirably the media layer is a non-woven felt layer and more preferably is a carbon impregnated non-woven felt layer.

Preferably the base platform is in the shape of a cylinder having a hollow central section adapted with a wastewater inlet, in use, allowing wastewater to flow therethrough the central section, and wherein the media layer is positioned substantially about the cylinder, and wherein the mesh layer is positioned substantially about the media layer and forming a negatively energized grid.

Advantageously the conduit is oriented in a substantially vertical position and being provided with a breather conduit extending from the top end of the conduit to above the wastewater level and into an airflow.

Preferably the electrified mesh layer is made of stainless steel.

Desirably the electrified mesh layer is supplied with a negative voltage charge of between substantially −0.001 and −24 volts relative to ground potential.

Advantageously the invention includes a water treatment system for use in the treatment of wastewater or contaminated water in a pond or chamber, the system including a material capable of being energized or electrostatically charged to form an active electrode, the energisable material being configured and arranged for placement in the flow of wastewater, and being supplied with a negative low voltage charge from a direct current power source to induce a negative electrostatic voltage charge in the wastewater so as to enhance the bonding qualities of solid surfaces in the wastewater environment effected by the area of the induced charge such that the surfaces attract suspended solids in the wastewater and cause the bonding of aerobic bacterial cultures to the surfaces.

Preferably the solid surfaces form a reference electrode and the surfaces include the inner wall or walls of the pond or chamber to which the wastewater is in contact, and wherein the solid surfaces are in the area effected by the induced charge capable of enhancing the bonding qualities of the surfaces.

Desirably the applied negative voltage charge is between about −0.001 and −24 volts charge relative to ground potential.

Optionally the water treatment system further comprises media introduced into the wastewater or chamber effected by the induced negative voltage charge, and wherein the media includes material capable of being charged by a negative electrostatic voltage sufficient to attract suspended solids in the wastewater and allow the bonding of such solids to the media. Preferably the media is pumas or zeolite.

Desirably the water treatment system further includes an apparatus having a base platform configured and arranged for placement in the flow of wastewater, the platform having a substantial surface area and a plurality of apertures therein, in use, for allowing water to flow therethrough, and wherein the other side of the platform from the flow of water is covered substantially with a media layer suitable for use in hosting bacterial cultures, and wherein the energisable material includes an electrified mesh layer attached to the media layer on the other side from the base platform, the mesh layer, in use, being supplied with an electrostatic negative voltage charge from a direct current power source to attract suspended solids in the wastewater and bond aerobic bacterial cultures to the media layer.

Preferably wherein the media layer is a carbon impregnated non-woven felt layer.

Desirably the base platform is in the shape of a cylinder having a hollow central section adapted with a wastewater inlet, in use, allowing wastewater to flow therethrough the central section, and wherein the media layer is positioned substantially about the cylinder, and wherein the mesh layer is positioned substantially about the media layer and forming a negatively energized grid.

According to a second aspect of the invention there is provided a method of treatment in a wastewater treatment system, the steps of the method including:

A.) placing an energisable material in the flow of wastewater;

B.) Energizing the material with a low voltage negative charge relative to ground potential to form an active electrode, and wherein the electrode induces an electrostatic charge so as to enhance the bonding qualities of solid surfaces in the wastewater effected by the area of the induced charge; and C.) allowing suspended solids and bacterial cultures in the wastewater to be attracted to the material that cause the bonding of aerobic bacterial cultures thereto.

Desirably the method in step B. is further defined by a power cable strung across the wastewater to additionally support the energisable material being suspended in the wastewater.

Preferably the method in step A. further includes the energisable material having a base platform with a media layer and a conductive mesh layer.

Desirably the method in step B. has an applied negative voltage charge of between substantially −0.001 and −24 volts relative to ground potential.

BRIEF DESCRIPTION OF THE DRAWINGS

Preferred embodiments of the invention will now be illustrated, by way of example only, with reference to the accompanying drawings in which.

DETAILED DESCRIPTION OF THE DRAWINGS

Figure 1:
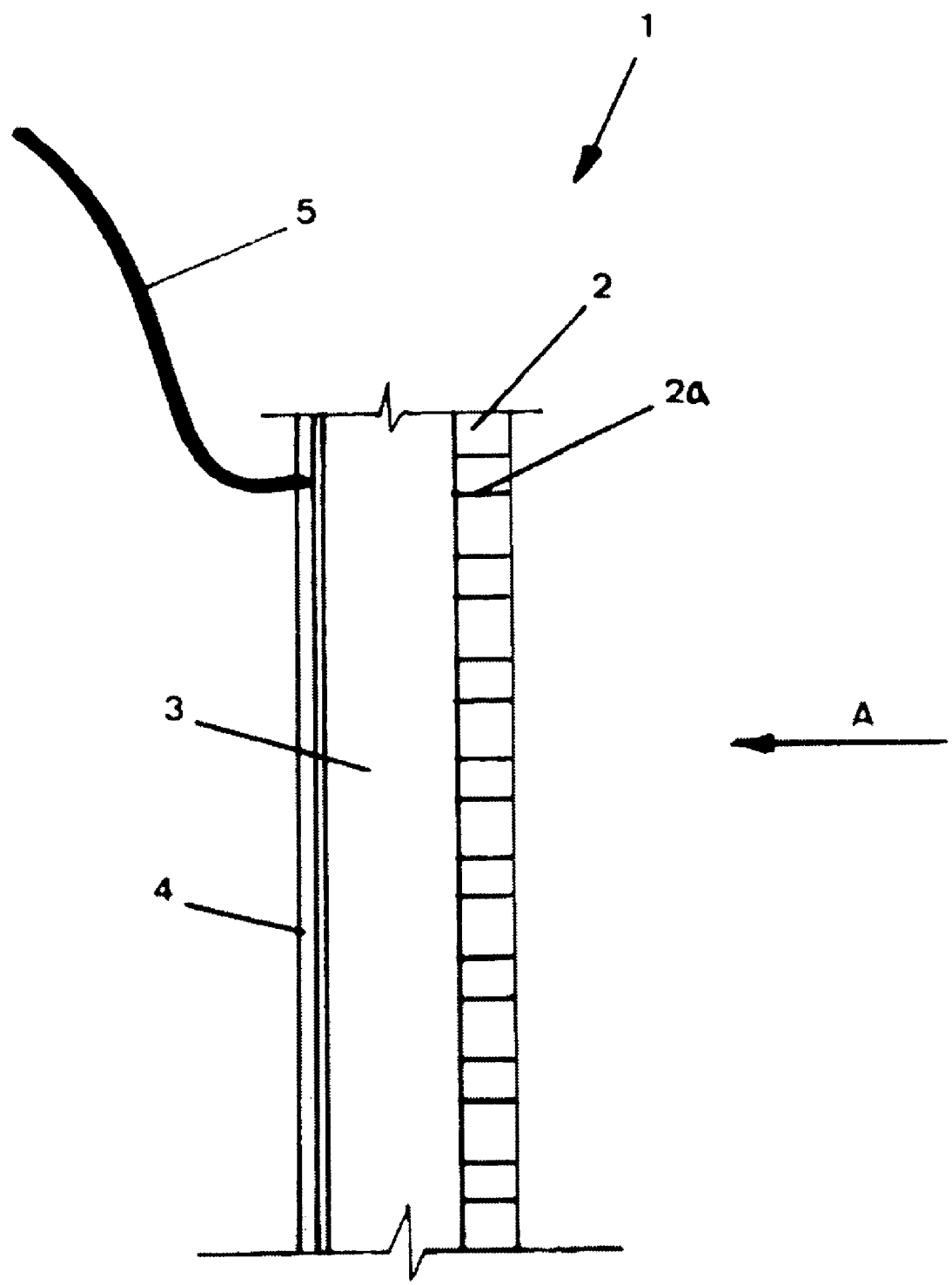
FIG. 1: illustrates an end view showing a cut away section of the sandwich construction of layers of the apparatus 1.
Figure 2:
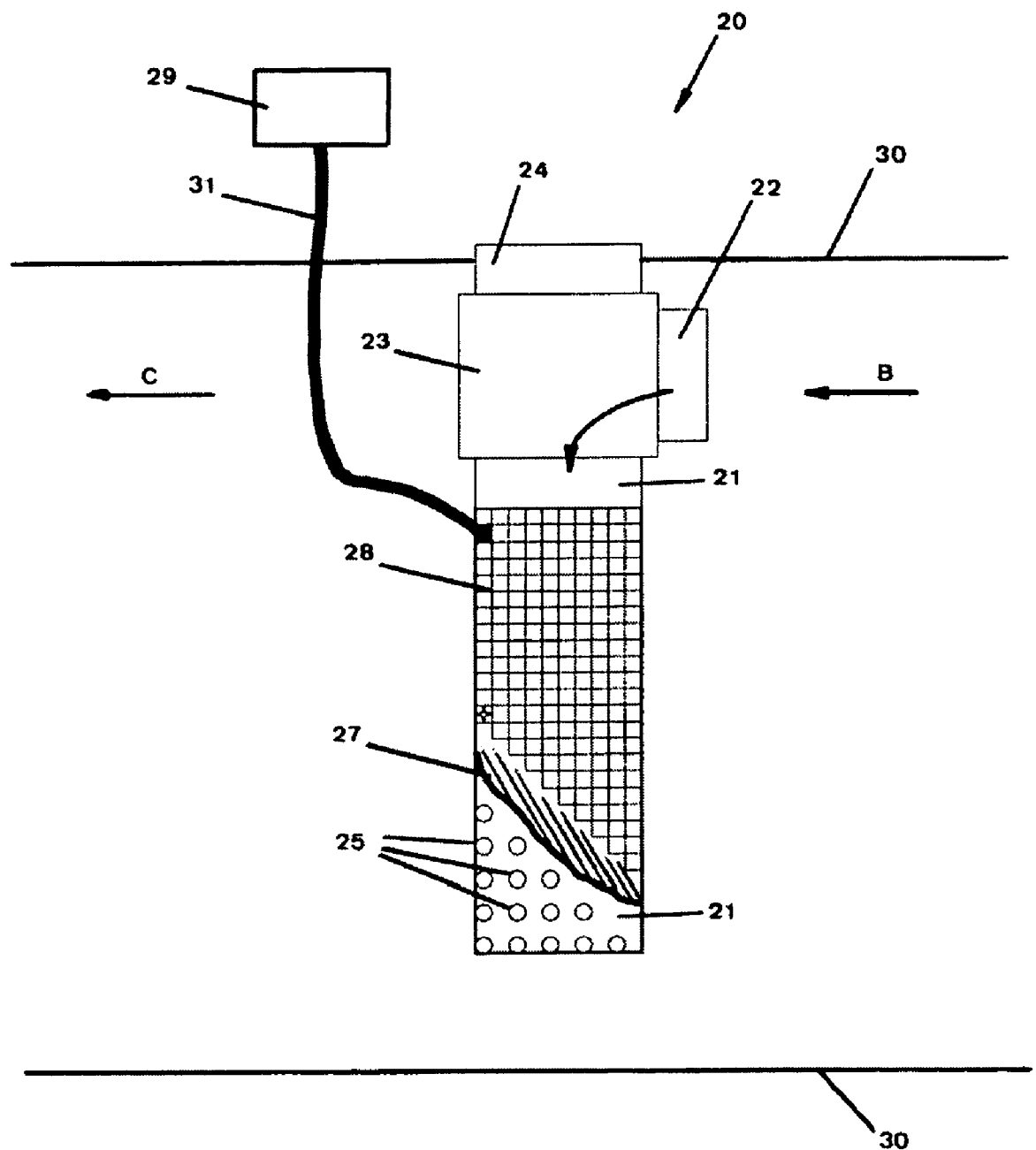
FIG. 2: illustrates a side view of a water treatment apparatus 1 with a cut away section in the lower end of the apparatus 1, in accordance with a first preferred embodiment of the invention.

Referring to FIGS. 1 and 2, a water treatment apparatus 1, according to a preferred embodiment of the invention, is illustrated.

The apparatus of the invention 1 is intended to be submerged or placed into wastewater in wastewater treatment systems to improve the quality of discharged wastewater flowing out of such treatment systems. The apparatus 1 is particularly suitable for treatment of suspended solids formed or passed on from earlier stages in the treatment of wastewater, and therefore is particularly suitable for use at the later stages of the process in the conduits or pipes between chambers, and/or in aeration and clarification chambers of wastewater treatment systems. The apparatus 1 allows for at least some suspended solids and other such bacterial cultures and the like to remain in the treatment system for an extended period of time for further processing and treatment.

Turning to FIG. 1, the cross section cut away view illustrates the sandwich construction of the media platform for attracting and acting on suspended solids and otherwise when in use in a water treatment system. The apparatus 1 includes a base platform 2 for defining the shape of the biological platform of the invention, and is made of any durable and resilient material suitable for use and placement in wastewater for extended periods of time. Suitable materials advantageously include non-conductive materials such as polymers including polyvinyl chloride (PVC) or any other suitable polymer. Alternatively, ceramics, hardened glass or metal covered with a non-conductive layer or any combination thereof may be used.

Preferably perforations 2a are provided in the base platform 2 to allow wastewater to seep through. In the example perforations in the form of a plurality of apertures 2a are provided. The size of the apertures 2a will be such as to allow wastewater to pass or seep therethrough but yet maintain the integrity of the base platform 2 in the face of a constant flow of wastewater at and about the base platform 2. It will be appreciated by those skilled in the art that the base platform 2 can comprise any shape or configuration for supporting a media layer 3 in the desired position and orientation such that the media layer 3 maintains a relatively high surface area.

A media layer 3 can be desirably positioned and arranged on the other side of the base platform 2 from the direction of flow of wastewater, indicated by arrow A. The media layer is for the purpose of hosting bacterial, particularly large cultures, and allowing suspended solids to be bonded thereto during the treatment process. This process allows, inter alias, for the breakdown of suspended solids that has not been fully broken down during the primary and secondary stages of treatment of wastewater, and before the wastewater flows into a dispersal field or otherwise.

The composition of the media layer includes any suitable durable and resilient material for effecting the purpose, and is preferably a non-woven fiber, and more preferably is a carbon impregnated non-woven fiber. This preference is due to the properties of carbon impregnated non-woven fiber in that is offers a high surface working area and is a relatively convenient material to apply to the sandwich construction of the apparatus 1. The surface area value for the media layer 3 can be any desirable and suitable value or density, and desirably in this non-limiting embodiment, the effective surface area value is advantageously between 800 and 1500 square meters per gram. This composition of media layer 3 allows for the proliferation of bacterial cultures, and such value is considered achievable when a carbon impregnated non-woven fiber is used. The thickness of the layer can be any suitable thickness to enable wastewater to flow therethrough, and may desirably include a thickness of between 2 to 10 millimeters, and more preferably is between 4 to 8 millimeters.

A mesh layer 4 is configured and arranged over the media layer 3. Such an arrangement conveniently sandwiches and restrains the media layer 3 between the base platform 2 and the mesh layer 4. The mesh layer 4 is adapted to be energized and therefore is made of a suitable conductive material capable of maintaining its integrity during operation substantially submerged in wastewater. Suitable materials include metal, and more preferably is a non corrosive material, and preferably is a stainless steel mesh or grid having a power cable 5 attached thereto at any convenient location on the mesh or grid layer 4 to supply the required electrostatic charge to the mesh layer 4.

The energized mesh layer 4 is advantageously electrified with an electrostatic negative voltage charge from a direct current power source. Any desirably voltage forming a potential difference of the mesh layer 4 to ground potential can be applied, depending on the application, and therefore it is considered that the mesh layer 4 and power source can be adapted to apply even a medium to high voltage, and a high voltages, as required. Further, the power source may be adapted to supply a variable voltage, and such voltage applied may be adjusted during the period of operation of the apparatus 1. Finally, it will be appreciated that any type and level of voltage charge that serves to allow bacterial cultures and suspended solids, inter alias, to bond to the media layer 3 during operation may be applied. This acknowledges that the apparatus 1 may be adapted to a variety of applications, and types of wastewater treatment systems.

In this non-limiting preferred embodiment, the negative charge may desirably be a lower voltage, and is substantially about −24 volt direct current charge, the charge being negative to earth or ground potential. It will be appreciated that the voltage charge can be varied quite substantially, although it will be appreciated that substantially −24 v DC will suffice to enhance the surface bonding qualities of the bacterial cultures on the media layer 3, and aid in the build up of suspended solids attracted to, and being bonded to, the media layer 3 during operation.

The power source may be located anywhere about the wastewater treatment system, and may be incorporated adjacent the base platform 2. Preferably, the power source is located externally of the base platform 2 and power is supplied via an insulated cable 5 into the wastewater system. The electrostatic charge applied to the mesh layer 4 is designed to attract suspended solids in the wastewater to the media layer 3 during operation.

Referring now more particularly to FIG. 2, a side view of a water treatment apparatus 20, as placed in the flow of wastewater within a pipe or chamber 30, in accordance with a preferred embodiment of the invention, is illustrated.

A base platform 21 is preferably a polymer conduit, and is advantageously in the shape of a cylinder. It can be oriented in any desirable direction, and in this embodiment is shown as being about 100 millimeters in diameter, and about 370 millimeters in length. Any desirable dimensions can be applied depending on the application.

The base platform 21 is adapted with a wastewater inlet 22 adjacent the top section 23 of the cylinder, and positioned in the side of the cylinder. Further, a breather section 24 is attached to the top section 23 and extends above the water level of the top of the chamber 30. As seen, the cylinder is preferably oriented in a substantially vertical position, thus allowing wastewater from upstream to flow into the inlet 22 in the direction of arrow B. The flow of wastewater exists downstream in the direction of arrow C.

The base platform 21 is provided with perforations 25 to allow wastewater to seep through. In this preferred embodiment, perforations in the form of a plurality of apertures 25 are provided. The size of the apertures 25 will be such as to allow wastewater to pass or seep therethrough from the central section, or from the outside of the cylinder, but yet maintain the integrity of the base platform 21 in the face of a constant flow of wastewater at and about the base platform 21.

A media layer 27 can be desirably positioned and secured about the outside of the cylindrical base platform 21. The media layer 27 is similar to that as described with reference to FIG. 1 and details will not be repeated.

A mesh layer 28 is configured and arranged over the media layer 27. Such an arrangement conveniently sandwiches and restrains the media layer 27 between the base platform 21 and the mesh layer 28. The mesh layer 28 is adapted to be energized and therefore is made of a suitable conductive material such as metal, and more preferably is a non corrosive material. Preferably the grid or mesh layer 28 is formed of stainless steel.

The energized mesh layer 28 is advantageously electrified with an electrostatic negative voltage charge from a direct current power source. The charge may desirably be a −24 volt direct current charge, the charge being negative to earth or ground potential. It will be appreciated that the voltage charge can be varied quite substantially, although it will be appreciated that substantially −24 v DC will suffice to enhance the surface bonding qualities of the bacterial cultures on the media layer 27, and aid in the build up of suspended solids attracted to, and clinging to, the media layer 27 during operation.

A suitable power source 29 is associated with the mesh layer 28, and a power cable 31 is attached to any convenient location on the mesh or grid layer 28 to supply the required electrostatic charge. The power source 29 may be located anywhere about the wastewater treatment system, and may be incorporated adjacent the base platform 21. Preferably, the power source 29 is located externally of the base platform 21 and chamber 30 as shown, and power is supplied via an insulated cable 31 into the wastewater system. The electrostatic charge applied is designed to attract suspended solids in the wastewater to the media layer 27 during operation.

Any suitable method of suspension of the apparatus 1 or attachment in the stream of wastewater in the treatment system may be employed, and it will be appreciated that a person skilled in the art should have the ability to install the apparatus 1 in a chamber or water pipe, as required.

Figure 3:
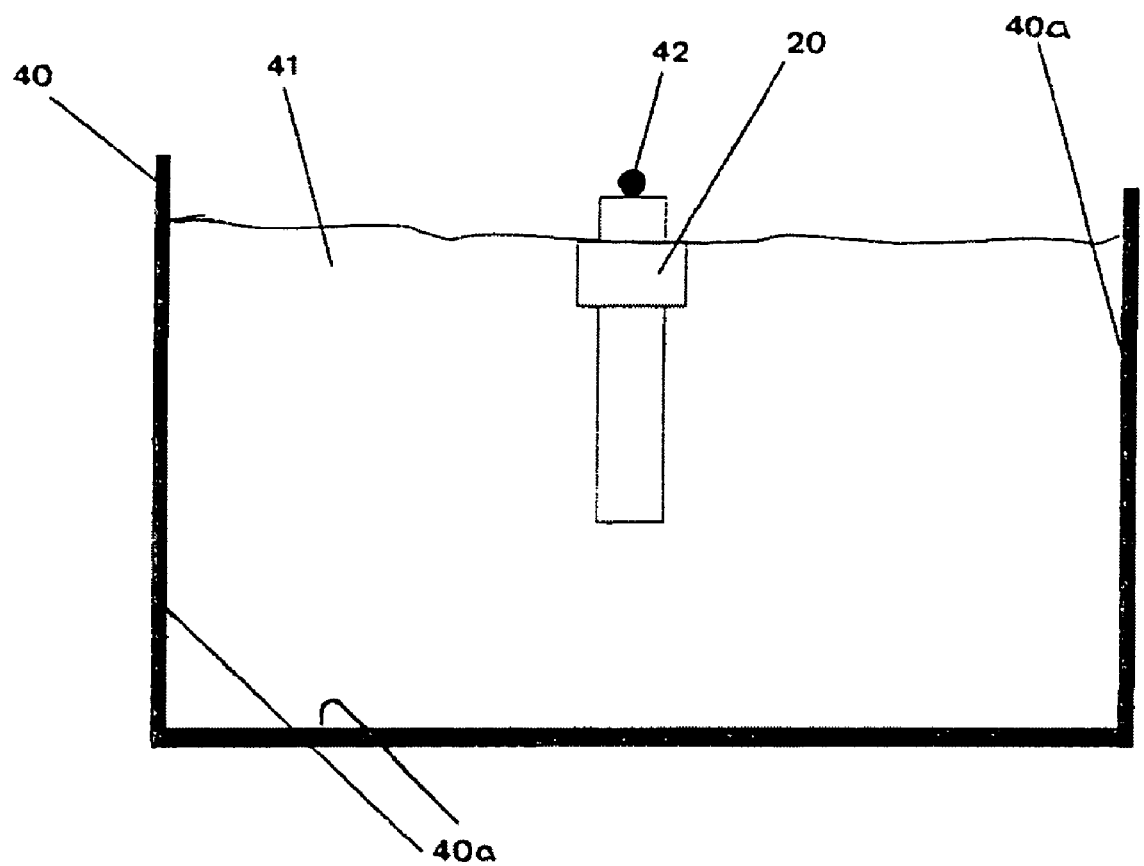
FIG. 3: illustrates a side view of a water treatment apparatus 20 in accordance with a second preferred embodiment of the invention.

Referring to FIG. 3, a side view of the water treatment apparatus 20 being electrically associated with a tank or chamber 40, in accordance with second preferred embodiment of the invention, is illustrated.

In the second preferred embodiment the apparatus 20 is seen to be advantageously electrically associated with the chamber 40. The chamber 40 is defined as being any vessel or conduit capable of retaining wastewater 41 and associated materials, and includes a tank, conduit, channel, pool, pond or the like. In this second embodiment the chamber 40 is shown as an open tank.

In FIG. 3 the chamber 40 may be an oxidation pond that may itself be earthen to ground potential, and the walls may be made of concrete or such composition, or be a tank that is made of a plastics material, whether conductive or not.

The apparatus 20 when supplied with a low voltage that is negative when referenced to earth or to the surrounding environment, is seen to function, in part, as an active electrode. This arrangement sets up an environment about the apparatus 20 whereby the installation is in circuit and the environment is used as a reference electrode.

Figure 4:
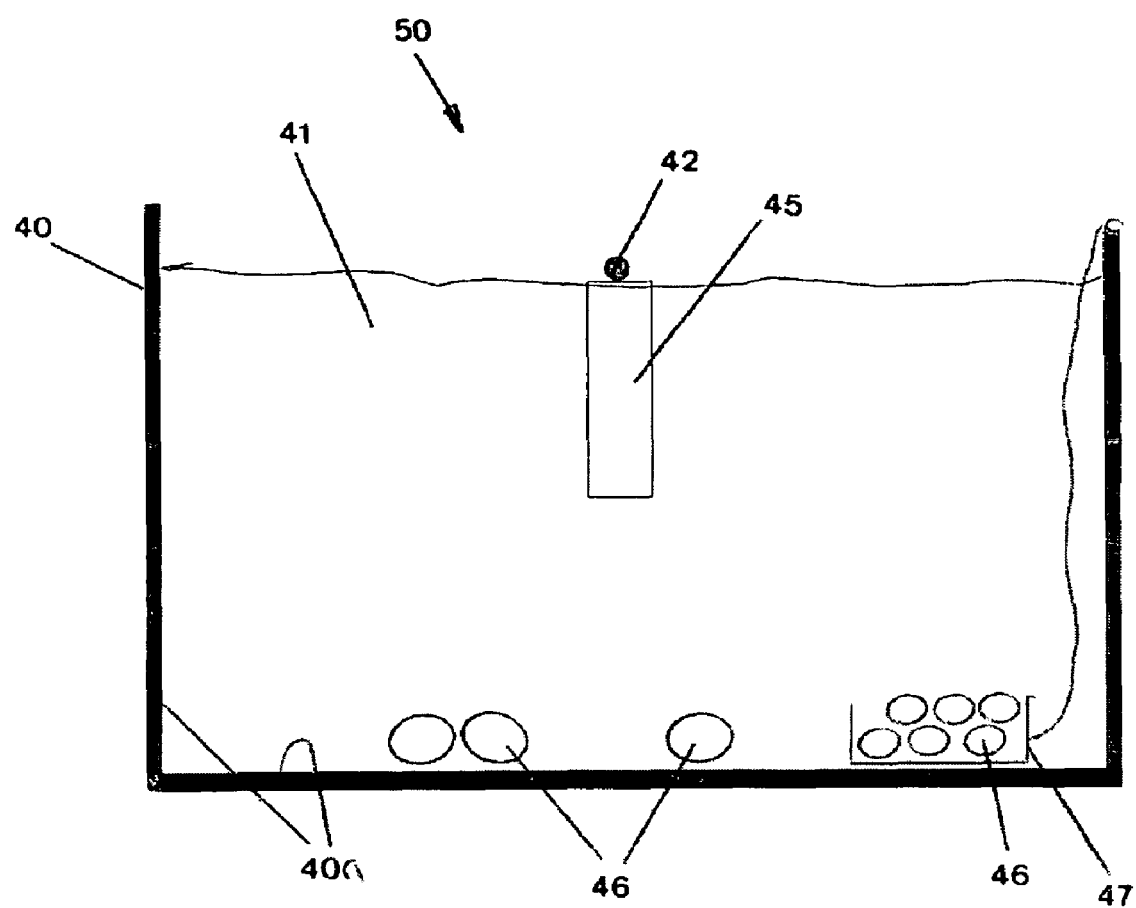
FIG. 4: illustrates a side view of a water treatment apparatus 50 in accordance with a third embodiment of the invention.

The main biological platform desirably has a high surface area and is preferably the cylindrical platform referred to as the media layer 27 in the apparatus 20 to which the mesh layer 28 is sandwiched. This mesh layer 28 is preferably electrified with an electrostatic negative voltage charge from a direct current power source supplied via cable 31 from the power source 29 as seen in FIG. 2. Such construction of the apparatus 20 is illustrated and described in detail with reference to FIGS. 1 and 2 and further detailed description will not be repeated. However, as seen in FIG. 3, the apparatus 20, or alternatively, a negatively charged energisable material 45 as seen in FIG. 4, forms an active electrode when mounted in a partially or fully submerged position in an oxidation pond or treatment tank by being suspended underneath the cable 42 and being associated with the cable 42 such that the high surface material forming the biological platform can be suitably charged to attract suspended solids in the wastewater being treated.

The charge is generally a low voltage charge, and is desirably in the range of between −0.001 and −24 volts, and more preferably between about −4 and −12 volts. The charge being negative when referenced to earth or ground potential. It is envisaged within the scope of the invention that the voltage charge can be adjusted as required to control the amount of bonding activity in the wastewater treatment system.

The apparatus 20 becomes an active electrode in the system, and in this respect the surrounding area becomes part of the electrical circuit due to the electrostatic field set up about the apparatus 20. It is considered that the active electrode sets up an electrostatic field that results in negative voltage charges being induced in the wastewater that have the highest potential difference at and adjacent the apparatus 20, and reduces in the areas radiating away from the apparatus 20 such that the lowest charge is located at the inner wall 40a.

It is seen that the charged surface areas that make contact with the wastewater within the chamber 40 attract suspended solids more than surfaces that do not have an induced charge by reason of the proximity of an active electrode. Although the areas and associated surfaces of the chamber 40 furthermost from the apparatus 20 may be exposed to a minimal charge, such surfaces can attract suspended solids and such solids can bond thereto. Furthermore, in accordance with an aspect of the invention, the voltage charge can be varied or adjusted quite substantially depending on the application, and such adjustment can be effective in enhancing the surface bonding qualities of the bacterial cultures attracted to the media layer 27, and to the secondary biological platform(s) of the wastewater surfaces proximate to the apparatus 20, and more particularly the inner walls 40a of the chamber 40. It is also envisaged within aspects of the invention that additional suitable media capable of attracting suspended solids to its surfaces, such as, for example, pumas and the like, can be placed into the wastewater in the chamber 40. It is seen that the media can receive an induced negative charge from the apparatus 20 and its surfaces may be enhanced to attract suspended solids and such solids can bond thereto.

It is seen during operation that an electrostatic charge as applied to the apparatus 20 is designed to attract suspended solids in the wastewater to bond to the media layer 27 and to bond to the secondary biological platforms of the inner surface(s) of the chamber 40.

Referring now to FIG. 4, a side view of a water treatment system 50, in accordance with a third embodiment of the invention, is illustrated.

The energisable material 45 is energized so as to induce a negative voltage charge in the wastewater of the chamber 40. The material 45 in this respect may be similar to the mesh layer 28 described with reference to the apparatus 20. However, instead of the media layer 27 serving as part of a biological platform for attracting suspended solids thereto as in the apparatus 20, the material 45 serves to induce a suitable negative voltage charge in the wastewater 41 of the chamber 40 to enhance the surface bonding qualities in proximity to the material 40 including the inner wall or walls 40a of the chamber 40 and any introduced suitable media 46 placed or suspended in the chamber 40 such as, for example only, pumas, zeolites or a combination thereof.

It is seen that the induced negative voltage charge can desirably increase the surface bonding qualities such that suspended solids in the wastewater 41 will be attracted to the surfaces and can bond thereto. The media 46 may include any suitable mineral, and pumas and zeolites are particularly porous materials that can serve well in the invention in the process of bonding suspended solids in wastewater 41 thereto.

It is envisaged that media 46 may be contained or cradled in any suitable container 47 that can be tethered and submerged in the chamber 40 as required. Such containers may be removable and replaced as required.

It will be appreciated that materials used for most components of the invention include any suitable durable and resilient materials, for example only but not limited to, timber, metal, plastics materials, fabrics, rubber, glass or any combination thereof.

Wherein the a foregoing reference has been made to integers or components having known equivalents, then such equivalents are herein incorporated as if individually set forth. Accordingly, it will be appreciated that changes may be made to the above described embodiments of the invention without departing from the principles taught herein.

It is to be understood that the above description is intended to be illustrative, and not restrictive. Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

The invention claimed is:

1. A water treatment system for use in the treatment of wastewater or contaminated water in a pond or chamber, the system including a material capable of being energised or electrically charged to form an active electrode, the pond or chamber having a solid surface that is electrically connected to ground potential to define a reference electrode, the energisable material being configured and arranged for placement in the flow of water, and being supplied, in use, with a negative low voltage charge from a direct current power source to induce a negative voltage charge in the water so as to enhance the bonding qualities of solid surfaces in the water environment effected by the area of the induced charge such that the surfaces attract suspended solids in the water and cause the bonding of aerobic bacterial cultures to the surfaces.

2. A water treatment system according to claim 1 wherein the solid surfaces of a pond, tank or chamber form the reference electrode by being conductive to ground potential, and whereby the active electrode is at least one electrode of the same potential that is placeable in the water, in use, to complete the electrical circuit of the installation between the reference electrode and the at least one active electrode, and whereby and the surfaces include the inner wall or walls of the pond or chamber to which the water is in contact, and wherein the solid surfaces are in an area effected by the induced charge capable of enhancing the bonding qualities of the surfaces.

3. A water treatment system according to claim 1 wherein the applied negative voltage charge is between about −0.001 and −24 volts charge relative to ground potential.

4. A water treatment system according to claim 1 further comprising media introduced into the water or chamber effected by the induced negative voltage charge, and wherein the media includes material capable of being charged by a negative voltage sufficient to attract suspended solids in the water and allow the bonding of such solids to the media.

5. A water treatment system according to claim 4 wherein the media is pumice or zeolite.

6. A water treatment system according to claim 1 further including an apparatus having a base platform configured and arranged for placement in the flow of water, the platform having a substantial surface area and a plurality of apertures therein, in use, for allowing water to flow therethrough, and wherein the other side of the platform from the flow of water is covered substantially with a media layer suitable for use in hosting bacterial cultures, and wherein the energisable material includes an electrified mesh layer attached to the media layer on the other side from the base platform, the mesh layer, in use, being supplied with an negative voltage charge from a direct current power source to attract suspended solids in the water and bond aerobic bacterial cultures to the media layer.

7. A water treatment system according to claim 6 wherein the media layer is a carbon impregnated non-woven felt layer.

8. A water treatment system according to claim 6 wherein the base platform is in the shape of a cylinder having a hollow central section adapted with a water inlet, in use, allowing water to flow therethrough the central section, and wherein the media layer is positioned substantially about the cylinder, and wherein the mesh layer is positioned substantially about the media layer and forming a negatively energised grid.

* * * * *